Patented Sept. 28, 1954

2,690,377

UNITED STATES PATENT OFFICE 2,690,377

COMPOSITIONS OF MATTER COMPRISING WATER SOLUBLE ALUMINUM PHOSPHATES AND METHOD OF PREPARING SAME

John W. Lefforge and Robert W. Atteberry, Anniston, Ala.

No Drawing. Application April 2, 1953, Serial No. 346,526

15 Claims. (Cl. 23—105)

This invention relates to stabilized aluminum hydrogen phosphate compositions and to a method of preparing same.

The primary object of the instant invention is to provide aqueous solutions of aluminum hydrogen phosphates which possess a markedly reduced tendency to crystallize as compared with the unstabilized solutions.

Another object of the invention is to provide aqueous solutions of aluminum hydrogen phosphates having a substantially reduced tendency to increase in viscosity during storage.

A further object of the invention is to provide new compositions of matter comprising solid, soluble aluminum hydrogen phosphates and boric acid, which, when dissolved in water, are characterized by a markedly reduced tendency to crystallize and increase in viscosity during storage.

Other objects and advantages will become apparent to those skilled in the art as the description of the invention proceeds.

The phosphates to which the present invention is directed are those aluminum hydrogen phosphates having an aluminum oxide to phosphorus pentoxide molar ratio within the range of about 1:3 to about 2:3. These aluminum phosphates may exist in the liquid or solid phase depending upon the amount of water that is present and the temperature of the product. The aluminum hydrogen phosphates which are liquid and solid at 20° C. are indicated in the graph of Patent 2,460,344 to Herbert L. Greger, which patent is incorporated by reference in the instant specification. These solid or liquid aluminum hydrogen phosphates are meta stable and in a relatively short time will devitrify and precipitate the stable crystalline form from aqueous solution. This precipitation takes place readily at room temperature and rapidly increases in rate with only slight increases in temperature. In addition, these aluminum hydrogen phosphates tend to increase greatly in viscosity under the above-mentioned conditions. The tendency of the aluminum hydrogen phosphates to devitrify and increase in viscosity presents a serious problem from the standpoint of storage, shipment and practical use of these products and, hence, there has arisen a demand in the art for a satisfactory solution to this problem.

In accordance with this invention, it has been found that aluminum hydrogen phosphates may be stabilized in aqueous solution against crystallization and rapid increase in viscosity by incorporating therewith a relatively small but effective amount of boric acid. The minimum, optimum and maximum amounts of boric acid used to effect stabilization depends upon a number of conditions such as concentration of the aluminum hydrogen phosphates, the aluminum oxide to phosphorus pentoxide molar ratio of the phosphate, the storage temperature, the time of actual use, i. e., how soon the solution is to be used or a combination of these conditions. Therefore, any attempt to define numerically the concentration of boric acid so as to meet all situations would be impractical and meaningless. However, since this variable may be readily determined by one skilled in the art, it is sufficient to state that it may be defined broadly as that amount which is required to stabilize substantially the solution of aluminum hydrogen phosphate against crystallization and rapid increase in viscosity. In general, about 0.5% to about 10% and preferably about 1% to about 5% by weight of boric acid, basis aluminum hydrogen phosphate, is sufficient to effect the desired stabilization, but it is to be understood that the invention is not restricted to these limits since larger or smaller amounts may be used, if desired. The following table illustrates various stabilizing amounts of boric acid which may be employed with aluminum hydrogen phosphates per se and aqueous solutions thereof:

| Lbs. of Boric Acid Per 100 Lbs. of Aluminum Hydrogen Phosphates | Lbs. of Boric Acid Per 100 Lbs. of 50% Solution of Aluminum Hydrogen Phosphates | Lbs. of Boric Acid Per 100 Lbs. of 5% Solution of Aluminum Hydrogen Phosphates |
|---|---|---|
| 0.5 | 0.25 | 0.03 |
| 1.0 | 0.50 | 0.05 |
| 4.0 | 2.00 | 0.20 |
| 10.0 | 5.00 | 0.50 |

The stabilizer may be mixed with aluminum hydrogen phosphates and the mixture dissolved in water to provide a stabilized aqueous solution; it may be added to an aqueous solution prepared by dissolving soluble, solid aluminum hydrogen phosphates in water or it may be incorporated with liquid aluminum hydrogen phosphates to effect stabilization against premature crystallization and excessive increase in viscosity during storage. Moreover, it may be added to the above aluminum hydrogen phosphates (solid or liquid) at some stage of their manufacture as more particularly described later on in this specification.

For a more complete understanding of the present invention, reference is made to the following illustrative examples.

EXAMPLE I

PREPARATION OF UNSTABILIZED AQUEOUS SOLUTION OF $Al_5H_{12}(PO_4)_9$ 1,000 parts of phosphorus pentoxide as 70–80% phosphoric acid is heated in a suitable reactor to 130° C. and to this heated material 366 parts of aluminum hydrate is added, with stirring, at such a rate that vigorous boiling is maintained. During this addition, water is formed and the boiling point of the reaction mixture drops to about 105° C. As soon as all of the aluminum hydrate is dissolved, the net weight of the solution is adjusted to 2300 parts with water containing 0.1% $H_3PO_4$ so as to produce a solution of aluminum hydrogen phosphate containing 65% solids. The diluted solution is cooled to about 60° C. and then 244 parts of aluminum hydrate, is added. The mixture thus obtained is stirred until all of the lumps disappear, whereupon the mixture is heated carefully, with stirring, to a temperature of about 75° C. At the end of the reaction, the reaction product is cooled to room temperature and then 600 parts of water containing 0.1% $H_3PO_4$ is added to yield as the final product a 50% solution of $Al_5H_{12}(PO_4)_9$.

EXAMPLE II

PREPARATION OF STABILIZED AQUEOUS SOLUTION OF $Al_5H_{12}(PO_4)_9$

The procedure disclosed in Example I was repeated and to each of three 120 cc. samples of the resulting product boric acid was added in amounts corresponding to 1%, 2% and 5% by weight, respectively. These samples and also a sample of the product produced in accordance with Example I were stored at 30° C. in 4 oz. wide mouth glass jars provided with metal screw caps protected with paper insert. All of these samples were periodically tested for viscosity using a Brookfield viscometer and the following results were obtained.

Table I

STORAGE OF UNSTABILIZED AND STABILIZED 50% AQUEOUS SOLUTION OF $Al_5H_{12}(PO_4)_9$

| Days In Storage | Viscosity At 30° C., Centipose×10³ | | | |
|---|---|---|---|---|
|  | 1 | 7 | 18 | 35 |
| Stabilizer: |  |  |  |  |
| None | 5.6 | 6.2 | (¹) | (¹) |
| 1% $H_3BO_3$ | 7.8 | 7.5 | 8.3 | (¹) |
| 2% $H_3BO_3$ | 9.0 | 7.0 | 8.2 | (¹) |
| 5% $H_3BO_3$ | 25.0 | 31.0 | 30.0 | 25 |

¹ More than 10% by volume crystallized.

It will be noted from the above table that boric acid greatly reduced the tendency of the aluminum phosphate solution to devitrify. In addition, it will be observed that the aluminum phosphate solutions showed only a slight tendency to increase in viscosity during the period of the storage tests.

EXAMPLE III

The procedure described in Example II was repeated and the resulting products were compared with a similar unstabilized product by subjecting them to the storage test described above except they were stored at a temperature of 40° C. instead of 30° C. The results of these tests are given in the following table.

Table II

STORAGE OF UNSTABILIZED AND STABILIZED 50% AQUEOUS SOLUTION OF $Al_5H_{12}(PO_4)_9$

| Days In Storage | Viscosity At 40° C., Centipose×10³ | | | |
|---|---|---|---|---|
|  | 1 | 7 | 18 | 35 |
| Stabilizer: |  |  |  |  |
| None | 3.0 | (¹) | (¹) | (¹) |
| 1% $H_3BO_3$ | 3.4 | (¹) | (¹) | (¹) |
| 2% $H_3BO_3$ | 3.6 | (¹) | (¹) | (¹) |
| 5% $H_3BO_3$ | 12.0 | 14 | 18 | 36 |

¹ More than 10% by volume crystallized.

The data set forth in the above table show that both the stabilized and unstabilized solutions are less stable at 40° C. than at 30° C., but that by increasing the amount of the stabilizer employed, satisfactory stabilization is obtained.

EXAMPLE IV

The procedure described in Example II was followed using 2% and 5% by weight of boric acid and similar amounts of oxalic acid. Samples of these stabilized products and a sample of an unstabilized 50% aqueous solution of $Al_5H_{12}(PO_4)_9$ were subjected to the storage test used in Example III. The results of this test are set forth in the following table.

Table III

COMPARISON OF BORIC ACID WITH OXALIC ACID AS STABILIZER FOR 50% AQUEOUS SOLUTION OF $Al_5H_{12}(PO_4)_9$ AT 40° C.

| Days In Storage | Viscosity At 40° C., Centipose×10³ | | | | | | | |
|---|---|---|---|---|---|---|---|---|
|  | 1 | 3 | 7 | 11 | 18 | 24 | 29 | 35 |
| Stabilizer: |  |  |  |  |  |  |  |  |
| None | 2.0 | 1.4 |  | (ᵃ) |  |  |  |  |
| 2% $H_3BO_3$ | 3.6 |  | 4.0 | 4.6 | (ᵃ) |  |  |  |
| 5% $H_3BO_3$ | 9.0 |  | 13.9 | 15.4 | 18.0 | 25.0 | 29 | 36 |
| 2% $(COOH)_2$ | 1.4 | 0.8 |  | (ᵃ) |  |  |  |  |
| 5% $(COOH)_2$ | 0.6 | 0.6 |  | (ᵃ) |  |  |  |  |

ᵃ More than 10% by volume crystallized.

The data given in the above table clearly indicate that boric acid is markedly superior to oxalic acid in its ability to stabilize the aluminum hydrogen phosphate solution against crystallization.

The boric acid may be added, as in Example II, to the solution of aluminum hydrogen phosphate at the end of the reaction leading to its formation or it may be added at some suitable stage during its manufacture. For example, it may be added to the phosphoric acid used in the initial reaction or to the reaction mixture at some point prior to, during, or after the secondary reaction with aluminum hydrate. However, it is preferred to introduce the boric acid after the addition of the secondary aluminum hydrate and prior to the dilution with acidified water and the final heating which leads to the completion of the secondary reaction with the hydrate. The reason for this is that if boric acid is added prior to or after this stage in the manufacture of aluminum hydrogen phosphates, considerable difficulty is encountered in effecting proper blending of the boric acid with the phosphate and/or the boric acid has a marked inhibitory effect on the reaction of both the primary and secondary aluminum hydrate.

The boric acid may be directly incorporated with the solid aluminum hydrogen phosphates and when this technique is employed, the boric acid is merely mechanically mixed with the finely ground phosphate. Moreover, the boric acid may be incorporated at some stage in the manufacture of the solid aluminum hydrogen phosphate, but the above procedure is preferable since adding it at some stage during its manufacture leads to difficulties similar to those encountered in the production of boric acid-stabilized liquid aluminum hydrogen phosphates.

The stabilizing action is not due simply to the increased acidity produced by the additive since storage tests with a number of acids such as sulfuric, hydrochloric and phosphoric acid showed that they had no stabilizing effect. In fact, these acids actually accelerated crystallization even though added in amounts equivalent to the boric acid used. Moreover, the retardation of crystallization is not due to the higher viscosity of the solutions stabilized by boric acid since stabilization takes place over a wide range of viscosities and concentrations of aluminum hydrogen phosphates.

The mechanism of stabilization is not known with certainty, but it is thought that the stabilizing effect of boric acid is due to the blocking of cross linkages between the linear aluminum phosphate chains by groups having low co-ordination numbers and more than one functional group.

The present invention is applicable to the stabilization of aqueous solutions of colloidal aluminum hydrogen phosphates having an aluminum oxide to phosphorus pentoxide molar ratio within the range of about 0.30 to about 0.67. These solutions may contain about 5% to about 75% and preferably from about 30% to about 65% by weight of aluminum hydrogen phosphates. As indicated earlier herein, the invention is also applicable to soluble, solid aluminum hydrogen phosphates having an aluminum oxide to phosphorus pentoxide molar ratio within the above limits, in which case the boric acid is preferably mixed with the finely divided solid material to provide a composition of substantially reduced tendency to crystallize when dissolved in water.

What we claim is:

1. A composition of matter comprising a water soluble aluminum hydrogen phosphate and a sufficient amount of boric acid to reduce substantially the tendency of said phosphate to crystallize when in contact with water, said phosphate having an aluminum oxide to phosphorus pentoxide molar ratio within the range of about 1:3 to about 2:3.

2. A composition of matter comprising a water soluble solid aluminum hydrogen phosphate and about 0.5% to about 10% by weight of boric acid, basis weight of said phosphate, said phosphate having an aluminum oxide to phosphorus pentoxide molar ratio within the range of about 1:3 to about 2:3.

3. A composition of matter comprising an aqueous solution of a water soluble aluminum hydrogen phosphate and about 0.5% to about 10% by weight of boric acid, basis weight of said phosphate, said solution containing about 5% to about 75% by weight of said phosphate and said phosphate having an aluminum oxide to phosphorus pentoxide molar ratio within the range of about 1:3 to about 2:3.

4. A composition of matter comprising an aqueous solution of a water soluble aluminum hydrogen phosphate and about 1% to about 5% by weight of boric acid, basis weight of said phosphate, said solution containing about 5% to about 75% by weight of said phosphate and said phosphate having an aluminum oxide to phosphorus pentoxide molar ratio within the range of about 1:3 to about 2:3.

5. A composition of matter comprising an aqueous solution of a water soluble aluminum hydrogen phosphate and about 2% by weight of boric acid, basis weight of said phosphate, said solution containing about 30% to about 65% by weight of said phosphate and said phosphate having an aluminum oxide to phosphorus pentoxide molar ratio within the range of about 1:3 to about 2:3.

6. A composition of matter comprising an aqueous solution of a water soluble aluminum hydrogen phosphate and about 0.5% to about 10% by weight of boric acid, basis weight of said phosphate, said solution containing about 30% to about 65% by weight of said phosphate and said phosphate having an aluminum oxide to phosphorus pentoxide molar ratio within the range of about 1:3 to about 2:3.

7. A composition of matter comprising an aqueous solution of a water soluble aluminum hydrogen phosphate and about 1.0% to about 5% by weight of boric acid, basis weight of said phosphate, said solution containing substantially about 30% to about 65% by weight of said phosphate and said phosphate having an aluminum oxide to phosphorus pentoxide molar ratio within the range of about 1:3 to about 2:3.

8. A composition of matter comprising a 50% aqueous solution of a water soluble aluminum hydrogen phosphate and about 0.5% to about 10% by weight of boric acid, basis weight of said phosphate, said phosphate having an aluminum oxide to phosphorus pentoxide molar ratio within the range of about 1:3 to about 2:3.

9. A composition of matter comprising a 50% aqueous solution of a water soluble aluminum hydrogen phosphate corresponding to the formula $Al_5H_{12}(PO_4)_9$ and about 0.5% to about 10% by weight of boric acid, basis weight of said phosphate.

10. A composition of matter comprising a 50% aqueous solution of a water soluble aluminum hydrogen phosphate corresponding to the formula $Al_5H_{12}(PO_4)_9$ and about 1% to about 5% by weight of boric acid, basis weight of said phosphate.

11. A composition of matter comprising a 50% aqueous solution of a water soluble aluminum hydrogen phosphate corresponding to the formula $Al_5H_{12}(PO_4)_9$ and about 2% by weight of boric acid, basis weight of said phosphate.

12. The method of producing an aqueous solution of an aluminum hydrogen phosphate having a substantially reduced tendency to crystallize, which comprises adding to said solution a relatively small but effective amount of boric acid, said solution containing from about 5% to about 75% by weight of said phosphate and said phosphate having an aluminum oxide to phosphorus pentoxide molar ratio within the range of about 0.30 to about 0.67.

13. The method of producing an aqueous solution of aluminum hydrogen phosphate having a substantially reduced tendency to crystallize, which comprises adding to said solution about 0.5% to about 10% by weight of boric acid, basis weight of said phosphate, said aluminum hydrogen phosphate having an aluminum oxide to phosphorus pentoxide molar ratio within the range of about 0.30 to about 0.67.

14. The method of producing an aqueous solution of aluminum hydrogen phosphate having a substantially reduced tendency to crystallize, which comprises adding to said solution about 1% to about 5% by weight of boric acid, basis weight of said phosphate, said aluminum hydrogen phosphate having an aluminum oxide to phosphorus pentoxide molar ratio within the range of about 0.30 to about 0.67.

15. The method of producing an aqueous solution of aluminum hydrogen phosphate having a substantially reduced tendency to crystallize, which comprises adding to said solution about 2% by weight of boric acid, basis weight of said phosphate, said aluminum hydrogen phosphate having an aluminum oxide to phosphorus pentoxide molar ratio within the range of about 0.30 to about 0.67.

References Cited in the file of this patent

UNITED STATES PATENTS

| Number | Name | Date |
|---|---|---|
| 2,324,124 | Williams | July 13, 1943 |
| 2,460,344 | Greger | Feb. 1, 1949 |
| 2,494,828 | Munter | Jan. 17, 1950 |